United States Patent
Liu et al.

(10) Patent No.: US 11,505,687 B2
(45) Date of Patent: Nov. 22, 2022

(54) ENVIRONMENTALLY DEGRADABLE FOAMED MASTER BATCH COMPOSITION AND USING THEREOF

(71) Applicant: Nano and Advanced Materials Institute Limited, Hong Kong (HK)

(72) Inventors: Xianqiao Liu, Hong Kong (HK); Yueying Chen, Hong Kong (HK); Yushen Wang, Hong Kong (HK)

(73) Assignee: Nano and Advanced Materials Institute Limited, Hong Kong (HK)

( * ) Notice: Subject to any disclaimer, the term of this patent is extended or adjusted under 35 U.S.C. 154(b) by 98 days.

(21) Appl. No.: 16/985,238

(22) Filed: Aug. 5, 2020

(65) Prior Publication Data
US 2022/0041848 A1 Feb. 10, 2022

(51) Int. Cl.
| | | |
|---|---|---|
| *C08L 23/30* | (2006.01) | |
| *C08K 5/092* | (2006.01) | |
| *C08K 5/1535* | (2006.01) | |
| *C08K 5/1545* | (2006.01) | |
| *C08K 5/098* | (2006.01) | |
| *C08J 3/22* | (2006.01) | |
| *C08J 9/00* | (2006.01) | |
| *C08J 9/08* | (2006.01) | |

(52) U.S. Cl.
CPC .............. *C08L 23/30* (2013.01); *C08J 3/226* (2013.01); *C08J 9/0023* (2013.01); *C08J 9/08* (2013.01); *C08K 5/092* (2013.01); *C08K 5/098* (2013.01); *C08K 5/1535* (2013.01); *C08K 5/1545* (2013.01); *C08J 2201/024* (2013.01); *C08J 2400/16* (2013.01); *C08K 2201/018* (2013.01); *C08L 2205/025* (2013.01)

(58) Field of Classification Search
CPC ........ C08J 3/223; C08J 9/08; C08K 2201/018
See application file for complete search history.

(56) References Cited

U.S. PATENT DOCUMENTS

| | | |
|---|---|---|
| 5,346,929 A | 9/1994 | Guttag |
| 5,461,094 A | 10/1995 | Yoo et al. |
| 6,218,532 B1 | 4/2001 | Mark et al. |
| 6,482,872 B2 | 11/2002 | Downie |
| 7,235,594 B2 | 6/2007 | Han et al. |
| 8,080,596 B2 | 12/2011 | Wu et al. |
| 8,513,329 B2 | 8/2013 | Lake et al. |
| 9,096,758 B2 | 8/2015 | Loos et al. |
| 9,637,608 B2 | 5/2017 | Rosen |

FOREIGN PATENT DOCUMENTS

| | | | | |
|---|---|---|---|---|
| CN | 1104656 | A | | 7/1995 |
| CN | 1267681 | A * | | 9/2000 |
| CN | 1431247 | A * | | 7/2003 |
| CN | 1583851 | A | | 2/2005 |
| CN | 101283025 | A | | 10/2008 |
| CN | 100494220 | C | | 6/2009 |
| CN | 101787156 | A | | 7/2010 |
| CN | 102633936 | B | | 8/2012 |
| CN | 102775545 | A | | 11/2012 |
| CN | 102775550 | A | | 11/2012 |
| CN | 106700202 | A * | | 5/2017 |
| CN | 106750714 | A | | 5/2017 |
| CN | 107400287 | A | | 11/2017 |
| CN | 107488298 | A | | 12/2017 |
| CN | 108530745 | A * | | 9/2018 |
| CN | 108912383 | A | | 11/2018 |
| CN | 108912384 | A | | 11/2018 |
| CN | 109134782 | A | | 1/2019 |
| CN | 109456506 | A | | 3/2019 |
| CN | 209348044 | U | | 9/2019 |
| CN | 209490477 | U | | 10/2019 |
| CN | 113512253 | A1 * | | 10/2021 |
| KR | 19980072370 | A * | 11/1998 | ............. C08L 23/06 |
| KR | 19980072379 | A | | 11/1998 |
| WO | 1993006013 | A2 | | 4/1993 |
| WO | 2013043040 | A2 | | 3/2013 |
| WO | 2014036681 | A1 | | 3/2014 |
| WO | WO-2020078682 | A1 * | | 4/2020 |

OTHER PUBLICATIONS

Machine translation of KR 19980072370 A (1998, pages).*
Machine translation of CN-1431247-A (2003, 11 pages).*
Machine translation of CN 113512253 A1 (2021, 8 pages).*
Machine translation of CN-1267681-A (2000, 8 pages).*
Machine translation of CN-106700202-A (2017, 6 pages).*
Machine translation of CN 108530745 (Sep. 2018, 5 pages).*
Office Action of corresponding China Patent Application No. 202010819619.0 dated Jul. 21, 2022.

* cited by examiner

*Primary Examiner* — Brieann R Johnston
(74) *Attorney, Agent, or Firm* — Idea Intellectual Limited; Margaret A. Burke; Sam T. Yip

(57) ABSTRACT

The present invention provides a master batch composition for environmentally degrading conventional plastics including a carrier resin, at least one oxidative degradant, at least one nature biodegradable degradant and at least one foaming agent. The present invention also provides a plastic product which is environmentally degradable at a very low cost versus conventional bio-sourced plastics, and has broad applications for single-use disposable applications or for short-lived products that are discarded within two years of manufacture.

15 Claims, 7 Drawing Sheets

ENVIRONMENTALLY DEGRADABLE FOAMED MASTER BATCH COMPOSITION AND USING THEREOF

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to a bio-foamed master batch composition and its application in plastic products. More particularly, the plastic products made of the bio-foamed master batch composition have both foaming and accelerated oxidation-biodegradation properties.

BACKGROUND

Plastics are one of the most versatile and widely used materials, which have an indispensable and important position in modern society. Whether it is household goods, daily necessities, food and beverage packaging or industrial supplies, almost all of them are related to the use of plastics. Plastic products have the advantages of lightness, high strength, corrosion resistance, high insulation, low cost, durable, etc. Their economic value is very high, thereby providing great convenience to human life. However, plastic products may also cause serious pollution and damage to the environment on which humans depend because more and more plastic products have become plastic waste after being used for a relatively short period of time. Such waste cannot be gradually decomposed over time in nature like other substances, so the waste accumulates in landfills, or is even scattered on the land or discarded in the ocean or in lakes, causing serious environmental pollution problems. Once the plastic waste is eaten by other creatures, it often results in death. For example, when the plastic debris floats on the surface of the ocean, the sunlight will decompose it into microplastic particles, which may be mistaken as food and eaten by birds, and thereby polluting the marine food chain.

In order to solve the problem of the plastic waste, plastic waste treatment by incineration using heat energy or recycling and reuse them have appeared. However, the burning of plastic waste produces harmful gases and pollutes the environment. While recycling is the most effective way to save energy and protect the environment, due to the difficulty of collection and sorting, the recycling process is complex and lacks a corresponding recycling channel. Further, recycling costs are high; as a result, less than 10 percent of plastic waste is successfully recycled. Therefore, there is an increasing demand for many plastic products used in the industries to be biodegradable.

At present, most of the environmentally degradable plastic products are vegetable-sourced biodegradable plastics such as polylactic acid (PLA) and polybutylene succinate (PBS) plastics, or oxo-biodegradable plastics such as Reverte® and P-Life®.

A common approach for producing bio-sourced biodegradable plastic products is to combine PLA with starch to obtain a composition that can be degraded through hydrolysis. However, when producing starch-based polymers, especially during the hot-melt extrusion step, several problems have been encountered. First, the molecular structure of the starch is adversely affected by the shear stresses and temperature conditions, it is necessary to plasticize the starch and pass it through an extrusion die. Second, the glass transition temperature of most of biodegradable resins is very low, which limits the field of application of the finished product. As a result, such bio-sourced biodegradable plastics have a very high cost with limitations in properties such as heat distortion resistance and brittleness compared with conventional plastics such as polypropylene (PP) and polyethylene (PE).

Further, the additives of the conventional oxo-biodegradable plastics can only degrade a thin film with a thickness less than 50 µm under UV light exposure, but fail to degrade the film under thermal degradation conditions, and the films do not fully comply with the industrial standards such as ASTM D6954 and GBT20197.

In view of the disadvantages of the existing biodegradable plastics, there is a need in the plastics art to develop novel additives, which can render conventional plastics such as PP and PE biodegradable.

SUMMARY OF THE INVENTION

To balance both biodegradability and cost, the present invention presents a solution to render conventional plastics naturally degradable by including functional additives.

Accordingly, an object of this invention is to provide a master batch composition for environmentally degrading conventional plastics.

The second object of the present invention is to provide an environmentally degradable plastic product which contains above master batch composition.

In a first aspect, the present invention provides a master batch composition for environmentally degrading conventional plastics including a carrier resin, at least one oxidative degradant, at least one nature biodegradable degradant and at least one foaming agent.

In a first embodiment of the first aspect of the present invention, the carrier resin includes thermoplastic polymers and their blends which have a melt temperature in a range of 60-250° C.

In a second embodiment of the first aspect of the present invention, the thermoplastic polymers and their blends include one or more polyethylene (PE), polypropylene (PP), poly vinyl chloride (PVC), polystyrene (PS) and Ethylene Vinyl Acetate (EVA).

In a third embodiment of the first aspect of the present invention, the at least one oxidative degradant includes one or more of metal carboxylate, metal stearate salts or a transition metal selected from manganese (Mn), iron (Fe), or cobalt (Co).

In a fourth embodiment of the first aspect of the present invention, the content of oxidative degradant ranges from 0.1-10 wt %.

In a fifth embodiment of the first aspect of the present invention, the at least one nature biodegradable degradant includes one or more of furanone, glutaric acid, cellulose, polycaprolactone and starch.

In a sixth embodiment of the first aspect of the present invention, the content of nature biodegradable degradant ranges from 0.1-10 wt %.

In a seventh embodiment of the first aspect of the present invention, the at least one foaming agent includes physical or chemical foaming agents selected from one or more of core-shell expandable microspheres, sodium salts of carbonic and polycarbonic acids.

In an eighth embodiment of the first aspect of the present invention, the content of foaming agent ranges from 0.01-50 wt %.

A second aspect of the present invention is to provide an environmentally degradable plastic product including the said master batch composition and a base plastic resin.

The master batch composition makes the plastic product have both foaming function and enhanced environmental oxidation and biodegradability.

In a first embodiment of the second aspect of the present invention, the base plastic resin includes polyethylene (PE), polypropylene (PP), poly vinyl chloride (PVC), polystyrene (PS) and Ethylene Vinyl Acetate (EVA).

In a second embodiment of the second aspect of the present invention, the bio-foamed composition and the base plastic resin are extruded at 140-300° C.

In a third embodiment of the second aspect of the present invention, the inside of the plastic product is a porous structure.

In a fourth embodiment of the second aspect of the present invention, the plastic is an oxo-biodegradable plastic or a heat-degradable plastic.

In a fifth embodiment of the second aspect of the present invention, the molecular weight of the plastic product is reduced to less than 5000 Daltons when being exposed to sunlight or heat conditions.

In a sixth embodiment of the second aspect of the present invention, the amount of master batch composition in the finished plastics product ranges from 0.3-10 wt %.

In a seventh embodiment of the second aspect of the present invention, the plastic product is used for single-use disposable applications or for short-lived products that are discarded within two years of manufacture.

The present biodegradable foamed plastics are environmentally degradable at a very low cost (e.g. HKD9/kg, bio-foamed PP) versus conventional bio-sourced PLA plastics (e.g. HKD30-60/kg, PLA), and have broad applications on household goods, daily necessities, food and beverage packaging or industrial supplies.

Detail of the biodegradable foamed master batch composition and their using are described hereinafter by embodiments and/or examples.

BRIEF DESCRIPTION OF THE DRAWINGS

Embodiments of the present invention are described in more detail hereinafter with reference to the drawings, in which.

DETAILED DESCRIPTION

In the following description, the present master batch composition and an environmentally degradable plastic product are set forth as preferred examples. It will be apparent to those skilled in the art that modifications, including additions and/or substitutions may be made without departing from the scope and the spirit of the invention, as set forth in the appended claims. Specific details may be omitted so as not to obscure the invention; however, the disclosure is written to enable one skilled in the art to practice the teachings herein without undue experimentation.

Figure 1:
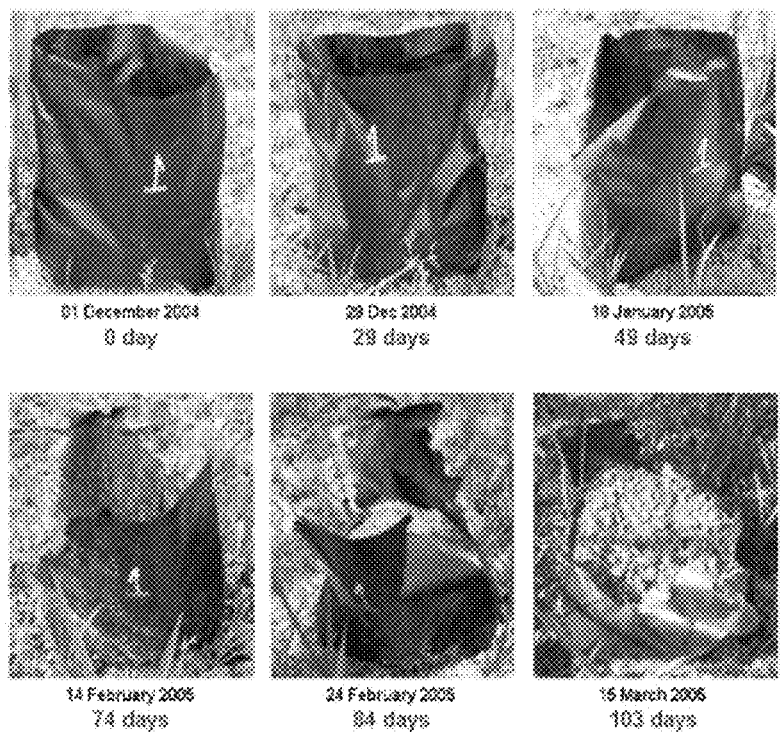
FIG. 1 (Prior art) depicts the test results of the structure of a garbage bag made of P-Life additives under outdoor sunlight.

Current problems with biodegradable plastics include the fact that the plastic products are not degradable under thermal conditions, only thin films can be photodegraded, and these plastic products do not fully comply with industrial standards (e.g. ASTM D6954, GBT20197). For example, FIG. 1 depicts the test results of the structure of a garbage bag made of P-Life additives under outdoor sunlight. From the results, it can be seen that the P-Life additives-containing garbage bag had reached the biodegradation effect after a certain period of time, but it could not be completely decomposed after 103 days.

In view of the above problems in the plastic field, the present invention provides the following solutions: one single master batch composition that combines both foaming and biodegradation properties; the master batch composition, when incorporated into a conventional polymer, forms a plastic that can be degraded under ultraviolet and high temperature conditions and is applicable to thermal-initiated oxidation; and the quality of the plastic made with the master batch composition is certified with industrial standards (e.g. ASTM D6954, GBT20197).

The present invention provides a novel master batch composition for environmentally degrading conventional plastics including a carrier resin, at least one oxidative degradant, at least one nature biodegradable degradant, at least one foaming agent and at least one lubricant. The master batch composition is configured to be integrated into conventional polymers by thermomechanical mixing.

In one embodiment, the carrier resin, oxidative degradant, nature degradant, foaming agent and lubricant were mixed to form a mixture, and it was transferred into a hopper of a twin-screw extruder, then the mixture was blended and melted in the twin-screw extruder, followed by pelletized through extrusion to obtain biodegradable foamed master batch composition. The said mixture was extruded with temperatures between 60-120° C. for 1-3 min, and the extrusion speed is 150-200 r/min. The prepared master batch composition combines both foaming agent and biodegradable ingredients, which render commodity plastics the function of both foaming and enhanced environmental oxidation and biodegradability.

The claimed master batch composition includes a carrier resin, 0.1-10 wt % of an oxidative degradant, 0.1-10 wt % of a nature biodegradable degradant, 0.01-50 wt % of a foaming agent, more particularly, 35-50 wt % of a foaming agent, and 0.01-10 wt % of a lubricant. The carrier resin includes thermoplastic polymers and their blends, which have a melting temperature in a range of 60-250° C., such as one or more of polyethylene (PE), polypropylene (PP), poly vinyl chloride (PVC), polystyrene (PS) and Ethylene Vinyl Acetate (EVA). The present invention has no special restrictions on the source of the carrier resin; any commercially available polymers can be used in the present invention. The oxidative degradant includes one or more of metal carboxylate, metal stearate salts or a transition metal selected from manganese (Mn), iron (Fe), or cobalt (Co). The nature biodegradable degradant includes one or more of furanone, glutaric acid, cellulose, polycaprolactone and starch. The foaming agent includes physical or chemical foaming agents selected from one or more of core-shell expandable microspheres, sodium salts of carbonic and polycarbonic acids.

In one embodiment, the content of the oxidative degradant ranges from 1 to 5 wt %; the content of the nature degradant ranges from 0.5 to 5 wt %; and the content of the foaming agent ranges from 0.5-10 wt %.

Figure 2:
FIG. 2 depicts a finished master batch composition.

In one embodiment, the foaming agent, UV and heat initiators and other additives were mixed with an ethylene-vinyl acetate copolymer, the blended mixture were then kneaded in a twin-screw extruder to extrude a bio-foamed master batch composition at a temperature of 80-200° C. for 1-2 min. The prepared master batch composition was shown in FIG. 2. The shape of the composition is not limited to any form.

In one embodiment, the master batch composition was white pellets with a diameter ranges from 1-4 mm, and the shape of the pellets can be cube, sphere, cuboid, polyhedron, ellipsoid, or any other shape.

The present invention also provides an environmentally degradable plastic product including the said master batch composition and a base plastic resin. The master batch composition makes the plastic product have both foaming function and enhanced environmental oxidation and biodegradability. The amount of master batch composition in the finished plastic product ranges from 0.3-10 wt %. The base plastic resin is selected from polyethylene (PE), polypropylene (PP), poly vinyl chloride (PVC), polystyrene (PS) and ethylene vinyl acetate (EVA). The bio-foamed composition and the base plastic resin are extruded at 180-300° C. The plastic material with the master batch added therein has sufficiently good mechanical properties that the plastic material may be formed through conventional manufacturing processes such as molding, blow-molding, extrusion, spinning, and hot pressing.

In comparison with existing plastic products, a plastic product incorporating the bio-foamed master batch composition of the present invention has a low processing cost, and the product may be completely degradable. In addition, the bio-foamed master batch composition of the present invention does not degrade the mechanical properties of the plastics, and completely solves the problems relating to the high cost of processing and forming biodegradable plastics. The master batch composition is configured to be integrated into conventional polymers by thermomechanical mixing.

In one embodiment, the bio-foamed master batch composition in the present invention imparts both foam-based and accelerated oxididation-based biodegradation to conventional polymers such as PP, PE. As a result, these biodegradable foamed plastics are environmentally degradable at a very competitive cost (e.g. HKD9/kg, bio-foamed PP) versus conventional PLA plastics (e.g. HKD30-60/kg, PLA). The formed plastic using the master batch has broad applications for use in household goods, daily necessities, food and beverage packaging or industrial supplies.

Adding the biodegradable foamed master batch composition into conventional polymers renders the long chains of the polymer molecule degradable under sunlight or heat environment conditions, thereby generating low molecular weight compounds, which can be absorbed by the soil or microorganisms, thus avoid pollution. From this, the waste of the plastic product can be automatically decomposed in the natural environment. The plastic product which contains the biodegradable foamed master batch composition has similar mechanical performance to conventional plastic products. Under natural conditions, the plastic products degrade into small molecules which are not harmful to the environment and are conducive to environmental protection.

Figure 3:
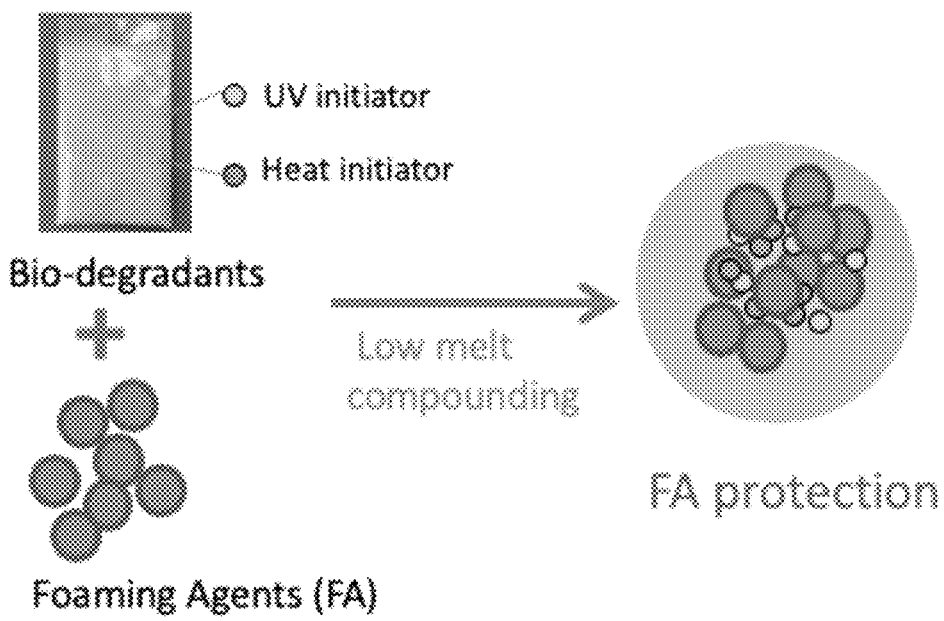
FIG. 3 depicts the protective effect of a foaming agent on the heat initiators and UV initiators.

In one embodiment, the foaming agent could protect the biodegradable additives such as UV-initiators or heat-initiators when being exposed to UV or heat oxidation, as shown in FIG. 3.

Figure 4:
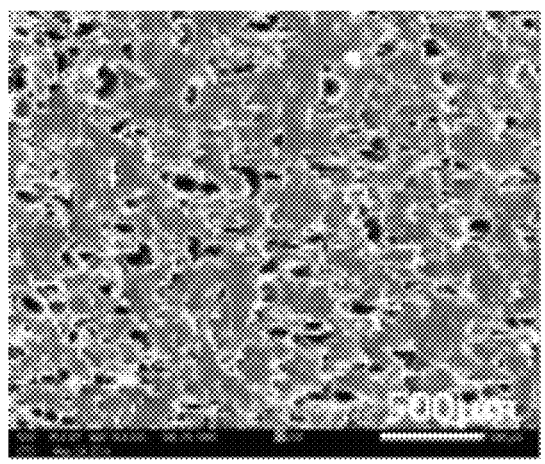
FIG. 4 depicts the internal structure of an environmentally biodegradable PP film.

When added to polymers, the master batch composition may, in one embodiment, form a plastic product having a porous structure. As a result, the molecular weight of the prepared biodegradable foamed plastics may be reduced to less than approximately 5,000 Daltons upon exposure to sunlight or thermal degradation environmental conditions. FIG. 4 depicts the internal structure of the prepared degradable foamed plastics; this microstructure advantageously accelerates biodegradation and fracture of polymer chains. Upon exposure to UV or thermal oxidative environments, the polymer chains of the biodegradable foamed plastics were decomposed into carboxylic acids, ketones, or alcohol, and the molecular weight of the plastic products was reduced to an average of less than approximately 5000 Daltons. Further, the carboxylic acid, ketone or alcohols are susceptible to further degradation by microorganisms to form water, $CO_2$ and biomass.

The biodegradable foamed plastic of the present invention has the same physical and mechanical properties as conventional plastic products. In particular, plastic products which contain the bio-foamed master batch composition comply with American Standard ASTM D6954: 2018 and GBT 20197, permitting them to be used in a wide variety of conventional plastic forming processes.

Further, the plastic products of the present invention achieve the effect of reducing environmental pollution, and meets the requirements of "Pollution Prevention Law" in respect of reduction, recycling and harmlessness.

The following examples are provided to illustrate the invention, which by no means are exhaustive. They are intended to be illustrative only and are not intended to limit the scope of the invention.

EXAMPLE

Example 1

Production of Master Batch Composition 2 wt % of Fe stearate, 3 wt % of Mn stearate, 45 wt % of a foaming agent, 5 wt % of starch, 3% glutaric acid and an ethylene-vinyl acetate copolymer were mixed. The blended mixture was kneaded in a twin-screw extruder at a temperature of 80-100° C. for 1-2 min, and subsequently extruded to obtain bio-foamed master batch composition.

Example 2

10 wt % of Mn stearate, 40 wt % of core-shell expandable microspheres, 5 wt % of starch, 2 wt % of furanone and an ethylene-vinyl acetate copolymer were mixed. The blended mixture was kneaded in a twin-screw extruder at a temperature of 80-100° C. for 1-2 min, and subsequently extruded to obtain bio-foamed master batch composition.

Example 3

6 wt % of Fe stearate, 35 wt % of a foaming agent, 2 wt % of a furanone, and a linear low-density polyethylene (LLDPE) were mixed. The blended mixture was kneaded in a twin-screw extruder at a temperature of 90-120° C. for 1-2 min, and subsequently extruded to obtain bio-foamed master batch composition.

Example 4

Production of Plastic Composition Product 1 wt % of the bio-foamed master batch composition obtained in Examples 1 and the polypropylene were extruded or molded to form the biodegradable foamed resin composition molded product by thermomechanical mixing. When being exposed to sunlight or under high temperature conditions, the polymer chains of plastics are decomposed into carboxylic acids, ketones, or alcohol, reducing the molecular weight of plastic products to less than 5000 Daltons. Further, the carboxylic acid, ketone or alcohol will be further degraded by microorganisms to form water, $CO_2$ and biomass.

Example 5

1 wt % of the bio-foamed master batch composition obtained in Examples 2 and the polyethylene were extruded or molded to form the biodegradable foamed resin composition molded product by thermomechanical mixing. When being exposed to sunlight or under high temperature conditions, the polymer chains of plastics are decomposed into carboxylic acids, ketones, or alcohol, reducing the molecular weight of plastic products to less than 5000 Daltons. Further, the carboxylic acid, ketone or alcohol will be further degraded by microorganisms to form water, $CO_2$ and biomass.

Example 6

2 wt % of the bio-foamed master batch composition obtained in Examples 3 and the polypropylene were extruded or molded to form the biodegradable foamed resin composition molded product by thermomechanical mixing. When being exposed to sunlight or under high temperature conditions, the polymer chains of plastics are decomposed into carboxylic acids, ketones, or alcohol, reducing the molecular weight of plastic products to less than 5000 Daltons. Further, the carboxylic acid, ketone or alcohol will be further degraded by microorganisms to form water, $CO_2$ and biomass.

Example 7

Table 1 shows the comparison of test results between a control biodegradable PP film (Sample #5) and the present claimed bio-foamed biodegradable PP film (Sample #4), pursuant to American Standard ASTM D6954. It could be seen from the above table that the present claimed biodegradable foamed PP film (Sample #4) passed Tier 1 test, which had a molecular weight 4988 Daltons in the 6th week, while the molecular weight of the control biodegradable PP film (Sample #5) was still higher than 6400 Daltons in the $6^{th}$ week.

TABLE 1

Test results of a control biodegradable PP film and a bio-foamed biodegradable PP film

| | Job Description | Passing criteria | Sample #4 (foamed BD PP) | Sample #5 (control BD PP) |
|---|---|---|---|---|
| ASTM D6954 Tier 1 | UV degradation test UV degradation test in accordance with ASTM D5208-14 & ASTM D 3826 Continuous UV with uninsulated black panel temperature controlled at 50° C. Duration: 14 days | Elongation to break ≤5% | Passed | Passed |
| | Accelerated Weathering UV degradation test Continuous UV with uninsulated black panel temperature controlled at 50° C. Duration: 60 days MW test MW test in accordance with ASTM D6474 Duration: 60 days | Average molecular weight <5000 g/mole (Daltons) | 0 week 308868.5 4 weeks 8311.5 6 weeks 4988 8 weeks 4369.5 | 0 week 310196 4 weeks 16673 6 weeks 6401.5 8 weeks 6427.5 |
| | Gel fraction test Gel fraction test in accordance with ASTM D2765 Duration: 14 days | Gel Fraction <5% | | |
| ASTM D6954 Tier 2 | Biodegradation test Biodegradation test in accordance with ISO 14855-1 Duration: 90 days | ≥60% of the organic carbon of the residue in Tier 1 shall be converted to CO2 in biodegradation within 24 months. | | |

Example 8

Figure 5:
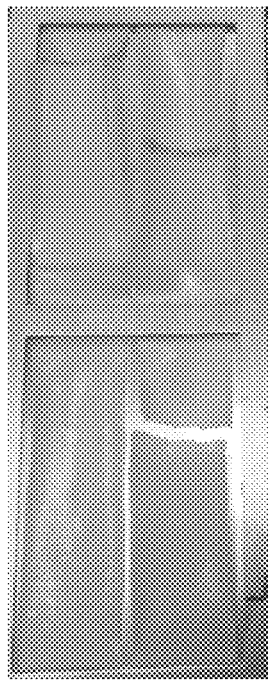
FIG. 5 shows a biodegradable foamed PP after 6.5 weeks accelerated weathering aging with complied to ASTM D6954 tier 1 in accordance with one embodiment of the present invention.

Table 2 shows the test results of the present claimed bio-foamed biodegradable PP film (Example 1), pursuant to American Standard ASTM D6954. It could be seen from the above table that the present claimed biodegradable foamed PP film (Example 1) passed Tier 1 test, which had a molecular weight 3503 Daltons in the 6.5th week. The sample after 6.5 weeks accelerated weathering aging is shown in FIG. 5.

TABLE 2

Test result of biodegradable foamed PP film (Example 1)

|  | Mw (Dalton) |
|---|---|
| Biodegradable foamed PP (Example 1) | 0 week: 387504<br>4 weeks: 6831<br>6.5 weeks: 3505 |

Example 9

3 wt % of Fe stearate, 4 wt % of Mn stearate, 35 wt % of a foaming agent, 2 wt % of a furanone, 1 wt % of a starch and an EVA were mixed. The blended mixture was kneaded in a twin-screw extruder at a temperature of 90 to 120° C. for 1-2 min, and subsequently extruded to obtain bio-foamed master batch composition. 1 wt % of the as-prepared bio-foamed master batch composition and the polypropylene were extruded or molded to form the biodegradable foamed resin composition molded product by thermomechanical mixing.

Figure 6:
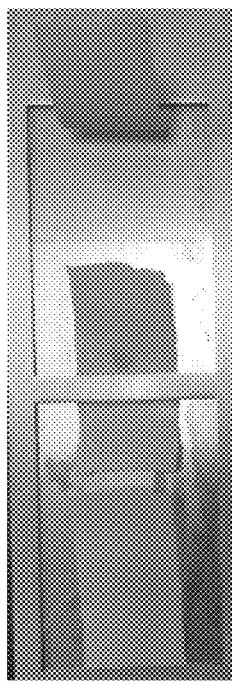
FIG. 6 shows BDP #1 after 6.5 weeks accelerated weathering aging with complied to ASTM D6954 tier 1 in accordance with another embodiment of the present invention.

Table 3 shows the test results of the as-prepared bio-foamed biodegradable PP film (BDP #1) pursuant to American Standard ASTM D6954. It could be seen from the above table that the present claimed biodegradable foamed PP film (BDP #1) passed Tier 1 test, which had a molecular weight 3905 Daltons in the 6.5th week. The sample after 6.5 weeks accelerated weathering aging is shown in FIG. 6.

TABLE 3

Test result of biodegradable foamed PP film (BDP#1)

|  | Mw (Dalton) |
|---|---|
| BDP#1 | 0 week: 387504<br>4 weeks: 9654<br>6.5 weeks: 3905 |

Example 10

5 wt % of Fe stearate, 45 wt % of a foaming agent, 2 wt % of a furanone, and an EVA were mixed. The blended mixture was kneaded in a twin-screw extruder at a temperature of 90 to 120° C. for 1-2 min, and subsequently extruded to obtain bio-foamed master batch composition. 1 wt % of the as-prepared bio-foamed master batch composition and the polypropylene were extruded or molded to form the biodegradable foamed resin composition molded product by thermomechanical mixing.

Figure 7:
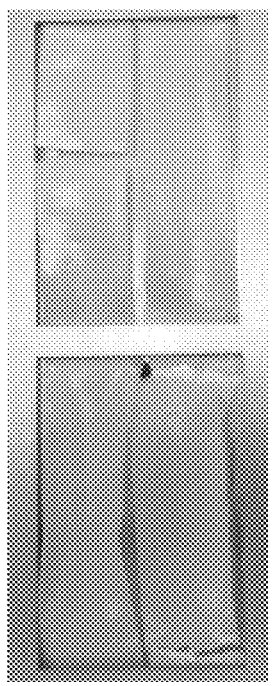
FIG. 7 shows BDP #12 after 6.5 weeks accelerated weathering aging with complied to ASTM D6954 tier 1 in accordance with other embodiment of the present invention.

Table 4 shows the test results of the as-prepared bio-foamed biodegradable PP film (BDP #12) pursuant to American Standard ASTM D6954. It could be seen from the above table that the present claimed biodegradable foamed PP film (BDP #12) passed Tier 1 test, which had a molecular weight 3759 Daltons in the 6.5th week. The sample after 6.5 weeks accelerated weathering aging is shown in FIG. 7.

TABLE 4

Test result of biodegradable foamed PP film (BDP#12)

|  | Mw (Dalton) |
|---|---|
| BDP#12 | 0 week: 387504<br>4 weeks: 7841<br>6.5 weeks: 3759 |

Definitions

Throughout this specification, unless the context requires otherwise, the word "comprise" or variations such as "comprises" or "comprising", will be understood to imply the inclusion of a stated integer or group of integers but not the exclusion of any other integer or group of integers. It is also noted that in this disclosure and particularly in the claims and/or paragraphs, terms such as "comprises", "comprised", "comprising" and the like can have the meaning attributed to it in U.S. patent law; e.g., they allow for elements not explicitly recited, but exclude elements that are found in the prior art or that affect a basic or novel characteristic of the present invention.

Furthermore, throughout the specification and claims, unless the context requires otherwise, the word "include" or variations such as "includes" or "including", will be understood to imply the inclusion of a stated integer or group of integers but not the exclusion of any other integer or group of integers.

References in the specification to "one embodiment", "an embodiment", "an example embodiment", etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "oxidation-biodegradation" means a process of reducing the molecular weight of plastics such as PE and PP to below 5000 Daltons oligomers or small molecules by oxidative degradation under environmental conditions such as light, heat or oxygen. The nature biodegradable degradant promotes the utilization of such small molecular weight polymers by microorganisms, and the polymers gradually undergo biodegradation into water, carbon dioxide and biomass.

Other definitions for selected terms used herein may be found within the detailed description of the present invention and apply throughout. Unless otherwise defined, all other technical terms used herein have the same meaning as commonly understood to one of ordinary skill in the art to which the present invention belongs.

It will be appreciated by those skilled in the art, in view of these teachings, that alternative embodiments may be implemented without deviating from the spirit or scope of the invention, as set forth in the appended claims. This invention is to be limited only by the following claims, which include all such embodiments and modifications when viewed in conjunction with the above specification and accompanying drawings.

What is claimed is:

1. A master batch composition for environmentally degrading conventional plastics, comprising:
   a carrier resin;
   at least one oxidative degradant selected from metal carboxylate and metal stearate salts;
   at least one natural biodegradable degradant; and
   at least one foaming agent selected from one or more of core-shell expandable microspheres and sodium salts of carbonic and polycarbonic acids, wherein the content of the foaming agent ranges from 35 to 50 wt %.

2. The master batch composition of claim 1, wherein the carrier resin comprises thermoplastic polymers and their blends which have a melt temperature in a range of 60-250° C.

3. The master batch composition of claim 2, wherein the thermoplastic polymers and their blends is selected from the group consisting of polyethylene (PE), polypropylene (PP), poly vinyl chloride (PVC), polystyrene (PS), Ethylene Vinyl Acetate (EVA), and mixtures thereof.

4. The master batch composition of claim 1, wherein the content of oxidative degradant ranges from 0.1 to 10 wt %.

5. The master batch composition of claim 1, wherein the at least one natural biodegradable degradant is selected from the group consisting of furanone, glutaric acid, cellulose, polycaprolactone, starch, and mixtures thereof.

6. The master batch composition of claim 5, wherein the content of the natural biodegradable degradant ranges from 0.1 to 10 wt %.

7. The master batch composition of claim 1, wherein the content of sodium salts of carbonic and polycarbonic acids ranges from 0.01 to 15 wt %.

8. An environmentally degradable plastic product comprising the master batch composition of claim 1 and a base plastic resin, wherein the master batch composition makes the plastic product have both foaming function and enhanced environmental oxidation and biodegradability.

9. The environmentally degradable plastic product of claim 8, wherein the base plastic resin comprises polyethylene (PE), polypropylene (PP), poly vinyl chloride (PVC), polystyrene (PS) and Ethylene Vinyl Acetate (EVA).

10. The environmentally degradable plastic product of claim 8, wherein the master batch composition and the base plastic resin are extruded at 140-300° C.

11. The environmentally degradable plastic product of claim 8, wherein the inside of the plastic product is a porous structure.

12. The environmentally degradable plastic product of claim 8, wherein the plastic product is an oxo-biodegradable plastic or a heat-degradable or plastic degradable under sunlight.

13. The environmentally degradable plastic product of claim 12, wherein the molecular weight of the plastic product is reduced to less than 5000 Daltons when being exposed to sunlight or heat conditions.

14. The environmentally degradable plastic product of claim 8, wherein the amount of master batch composition in the plastic product ranges from 0.3 to 10 wt %.

15. The environmentally degradable plastic product of claim 8, wherein the plastic product is used for single-use disposable applications or for short-lived products that are discarded within two years of manufacture.

* * * * *